United States Patent [19]

Nordskog

[11] Patent Number: 4,776,903

[45] Date of Patent: Oct. 11, 1988

[54] METHOD OF FABRICATING A LIGHT WEIGHT PLASTIC VEHICULAR INTERIOR BUILDING CONSTRUCTION

[76] Inventor: Robert A. Nordskog, 18135 Karen Dr., Tarzana, Calif. 91356

[21] Appl. No.: 555,176

[22] Filed: Nov. 25, 1983

[51] Int. Cl.[4] .............................................. B32B 31/00
[52] U.S. Cl. ...................... 156/64; 52/309.9; 52/747; 156/153; 156/211; 156/258; 156/268; 156/280; 156/281; 156/295; 156/304.3; 156/304.5; 244/133; 312/214; 428/314.4; 428/319.3
[58] Field of Search ............... 156/64, 268, 153, 280, 156/211, 281, 258, 295, 304.3, 304.5; 428/314.4, 319.3; 52/309.9, 747; 312/214; 244/133

[56] References Cited

U.S. PATENT DOCUMENTS

| | | | |
|---|---|---|---|
| 2,896,271 | 7/1959 | Kloote et al. | 52/309.9 |
| 3,400,018 | 9/1968 | Morgan et al. | 156/323 |
| 3,943,022 | 3/1976 | Susnjara | 156/211 |
| 4,316,934 | 2/1982 | Maier et al. | 428/319.3 |
| 4,351,870 | 9/1982 | English | 428/314.4 |

*Primary Examiner*—John J. Gallagher
*Attorney, Agent, or Firm*—John J. Posta, Jr.

[57] ABSTRACT

A lightweight building structure and method of fabrication is provided which is especially adapted for use in airline galleys or other interior vehicular constructions. It includes fireproof sandwich/core panels interconnected by plastic adhesive in a novel manner. The method of fabrication includes construction of the assembly in a clean environment, including forming and mating components in the panels, cleaning and deburring the components, adhesively interconnecting the panels prior to further cleaning prior to painting. The assembly is constructed in a manner to insure a completely smooth and continuous surface which enables ease of cleaning while preventing accumulation of dust and dirt.

5 Claims, 3 Drawing Sheets

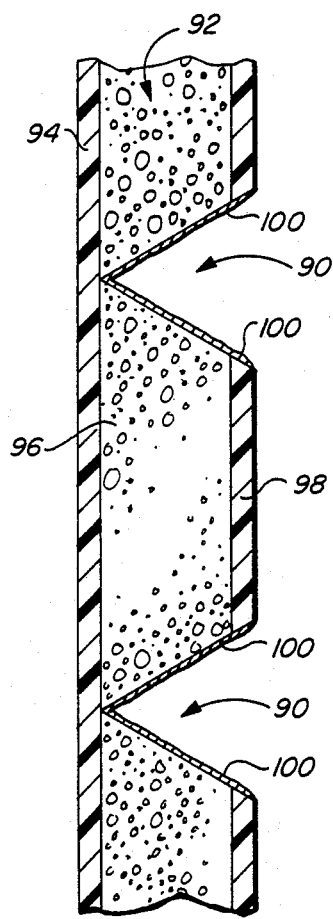
_FIG_11
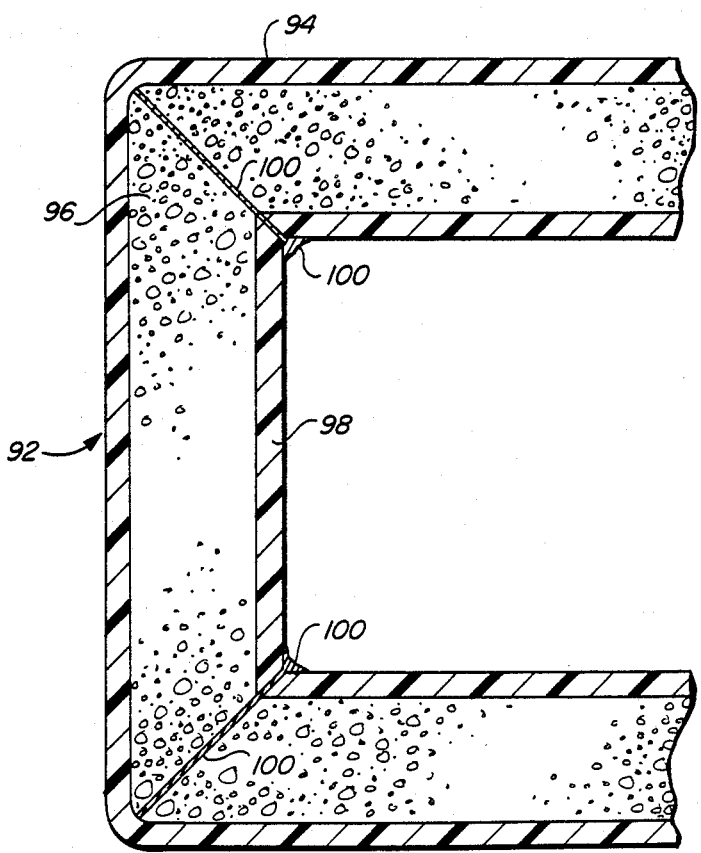
_FIG_12

METHOD OF FABRICATING A LIGHT WEIGHT PLASTIC VEHICULAR INTERIOR BUILDING CONSTRUCTION

BACKGROUND OF THE INVENTION

1. Field of the Invention

The present invention generally relates to building constructions and more particularly to an improved method of fabricating a novel, low weight plastic building construction particularly adapted for use in aircraft and other vehicles.

2. Prior Art

Vehicular interior building structures, particularly those used in large aircraft, have traditionally been constructed of heavy duty, durable metals, such as steel, reinforced aluminum and the like, alone or in combination with relatively heavy plastics such as fiberglass and the like. For example, airline galleys for the past 25 years have been constructed primarily of high tensile strength aluminum alloys coupled with stainless steel and relatively rigid heavy plastics. Due to the tremendous recent increase in the cost of vehicular fuel, such as jet fuel, the weight of all vehicular components is being carefully scrutinized. Airlines are losing money and certain flights are being curtailed. Weight reductions of interior aircraft constructions and the like must now be made in order to reduce the consumption of jet fuel sufficiently and/or allow a sufficient increase in passenger and cargo loading to make commercial flights profitable once more. Basically the same problem faces the passenger car, bus and truck industry. The cost of fuel has necessitated a drastic reduction in vehicular body shell weight. Further reductions are needed and must come in part from the use of lighter, stronger interior constructions which are thermally and acoustically insulative and are flame retardant.

Accordingly, there is a need for an improved form of inexpensive vehicular interior building construction which has superior strength, adaptability, flame resistance, thermal and acoustical properties and which is substantially lighter in weight than conventional constructions.

There is also a need for an improved inexpensive method of fabricating such constructions, which method will assure permanent anchoring of the components thereof and will provide such constructions with continuous unbroken surfaces which are easy to maintain, for example, can be kept germ free in the case of vehicular galleys and the like.

SUMMARY OF THE INVENTION

The improved method of the present invention satisfies all the foregoing needs. The method is substantially as set forth in the abstract above. Thus, the method provides for the fabrication of an improved light weight, all plastic vehicular interior building construction, which is particularly well adapted for use in commercial airline galleys but is also useful in other airplane interior components such as airplane interior room partitions, and dividers, for example, cloakrooms, storage compartments, etc. Furthermore, it is useful in truck, bus and passenger car interior panels, such as dashboards, seat benches, luggage compartment dividers, etc. The construction has been found to reduce airfuel consumption and permit higher passenger and cargo loading for improved economy.

The panels of the construction each comprise a sandwich containing a sheet of rigid core material comprising expanded closed cellular plastic. The core is light in weight, flame resistant and thermally and acoustically insulative. The sides of the core in the sandwich are abutted by light weight, high tensile strength sheets of fibrous or other plastic which is also flame resistant. The panels are joined together by plastic adhesive with or without flexible flame resistant plastic cloth bonded in place, and/or other similar means to provide the desired rigid light weight unitary construction.

The method of the present invention includes forming and sizing mating components in the panels, cleaning and deburring. these components, then adhesively interconnecting the panels through the mating components while in a clean dust-free environment to assure complete permanent bonding of the panels together, without introduction of contamination thereto. Preferably, the resulting construction is further cleaned and painted while still in the clean environment and is then ready for use.

Another novel feature of the present method is the cutting of one or more v-shaped notches through one side sheet and the backing core to the opposite side sheet of a given panel, then adhesively coating the notches in a clean environment and bending the uncut side sheet to close the notches. The notches are held in the clean environment until the now curved panel is permanently set. This provides the panel with a continuous, unbroken, smooth curved outer skin which resists accumulation of dirt and provides a strong structure.

Further features are set forth in the following detailed description and accompanying drawings.

DRAWINGS OF THE INVENTION

FIG. 10 (a) shows the panel of FIG. 10 after being bent over and sealed together, as per the present method;

FIG. 11 is a schematic fragmentary cross section of another panel notched with a pair of spaced V-shaped notches in accordance with the present method; and, FIG. 12 is a schematic fragmentary cross section of the panel of FIG. 11 after the notches are closed to sealed in accordance with the present method.

DETAILED DESCRIPTION OF THE DRAWINGS

FIG. 1

Figure 1:
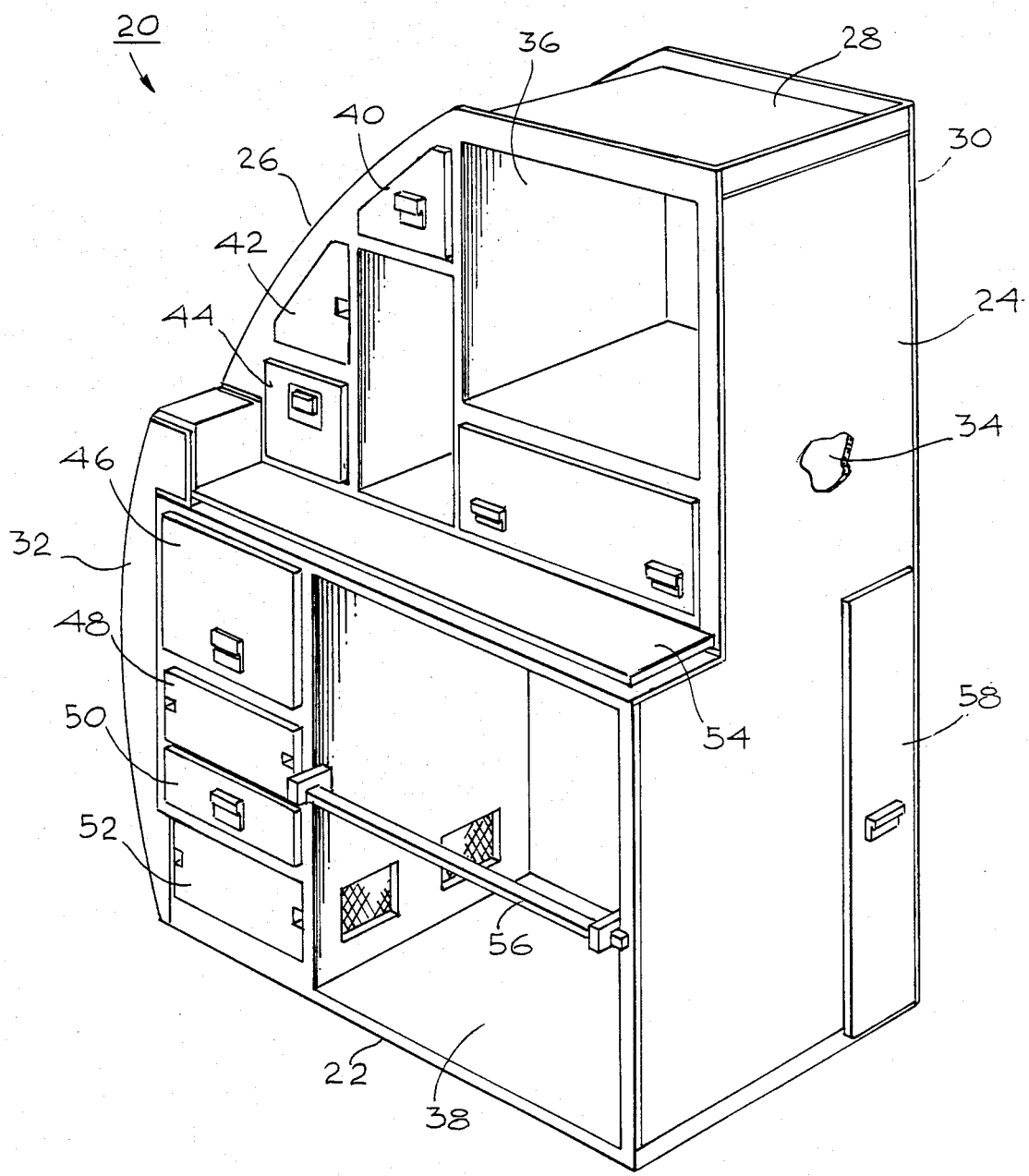
FIG. 1 is a schematic perspective view of a preferred embodiment of a portion of an airline galley, prepared in accordance with the present method.

Now referring more particularly to FIG. 1 of the accompanying drawings, a preferred embodiment of an improved light weight vehicular interior building construction made in accordance with the method of the present invention is schematically depicted therein. Thus, an airline galley unit 20 is shown which includes interconnected components comprising a horizontal base 22, upstanding sidewalls 24 and 26, a horizontal top 28, a vertical back 30, and a specially configured generally vertical front 32, defining therebetween an enclosed central interior space 34.

As can be seen from FIG. 1, wall 26 is curved to conform to aircraft interior bulkhead design and/or appearance requirements. Moreover, galley unit 20 includes a plurality of internal panels (not shown) which divide up space 34 to form a number of compartments, for example top compartment 36 and bottom compartment 38, both of which are open at front 32 and are adapted to receive, for example, respectively, a heating range and an aisle serving cart (not shown). Unit 20 can also include, for example, front opening compartments 40, 42, 44, 46, 48, 50 and 52, most of which include front door or drawer coverings. A horizontal counter or shelf 54 is also provided in Unit 20, as well as a cart retaining bar 56 or the like horizontal brace means, as shown in FIG. 1, and a aisle side compartment access door 58.

FIGS. 2-10 (a)

The components of galley unit 20 are formed of interconnected panels 60. Each panel 60 comprises a core 62 in the form of a flat sheet of closed cellular expanded plastic, such as that sold under the trademark Klegecell. Such sheet may be, for example, about 0.625 to 0.875 inch thick, with a density of about 4.5 pounds per cubic foot. Other densities are also useful. Klegecell is the trademark of American Klegecell Corporation. It is made from a blend of plastic resins and exhibits good chemical resistance, is gas tight, vermin proof and waterproof. Moreover, it is extremely strong, light in weight and has superior stiffness, and thermal and acoustical insulativity. It is also substantially nonflammable and is compatible with other plastic compositions. Any other plastic which exhibits equivalently high thermal and acoustical insulative properties, light weight, structural strength, rigidity and flame resistance can also be used in place of or in addition to Klegecell. For example, high temperature foam flame-resistant foamed phenolic resins, such as phenol formaldehyde resins or foamed polyimide resins and the like can be used. Other high temperature thermosetting resins can be employed.

In each panel 60 opposite sides 64 and 66 of core sheet 62 are abutted by flat self-supporting sheets 68 and 70 of selected aromatic fibrous plastic material. Sheets 68 and 70 may, for example, have typical thickness as of about 0.016 to about 0.063 inches.

This plastic material has extremely high tensile strength of the order of five times that of a comparable weight of stainless steel, and much higher than fiberglass and is extremely light in weight, while being flexible, tough and resilient so as to be able to withstand shocks during use in aircraft and other vehicles. Moreover, plastic sheets 68 and 70 are heat resistant and flame retardant. Preferably, sheets 68 and 70 are of material sold under the trademark Kevlar. Kevlar is the registered U. S. Trademark of E. I. DuPont de Nemurs, Wilmington, Del. Any suitable plastic having similar properties can be used in addition to or in place of Kevlar plastic for sheets 68 and 70. For example, fiber or glass fiber-carbon reinforced polyimide plastics can be used.

Figure 2:
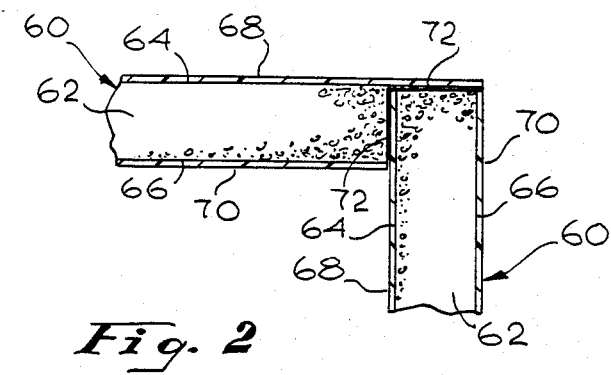
FIG. 2 is an enlarged fragmentary cross section of the interconnected ends of horizontal and vertical panels of the construction of FIG. 1.
Figure 3:
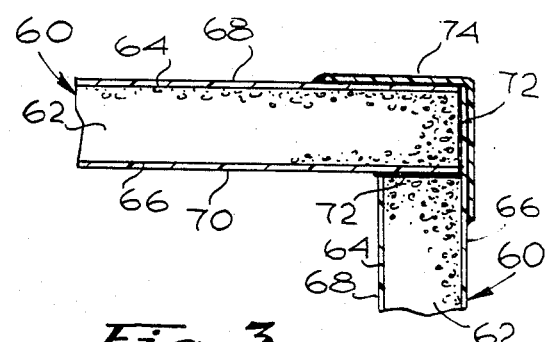
FIG. 3 is an enlarged fragmentary cross section of the interconnected ends of horizontal and vertical panels of the construction of FIG. 1 employing an exterior reinforcement of flexible bonded plastic cloth.
Figure 4:
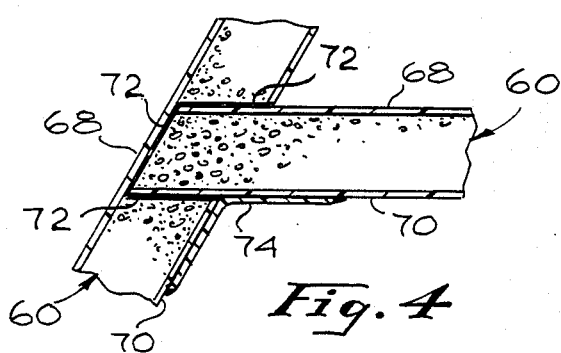
FIG. 4 is a schematic fragmentary cross section of interconnected horizontal and diagonal panel of the construction of FIG. 1 reinforced with flexible bonded plastic cloth.
Figure 5:
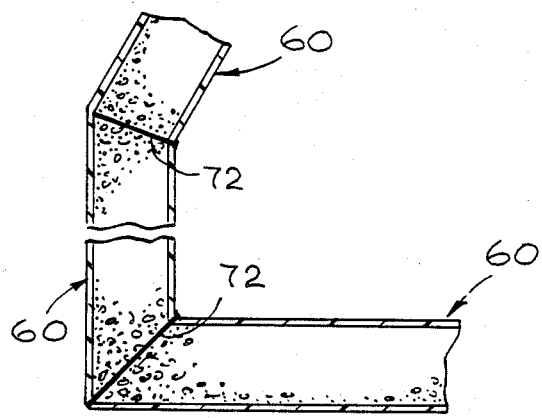
FIG. 5 is a schematic fragmentary cross section of interconnected vertical, horizontal and diagonal panels of the construction of FIG. 1.
Figure 6:
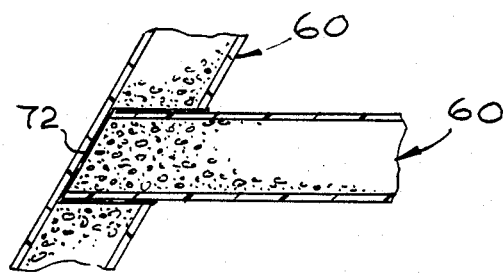
FIG. 6 is a schematic fragmentary cross section of interconnected horizontal and diagonal shelving panels of the construction of FIG. 1.
Figure 7:
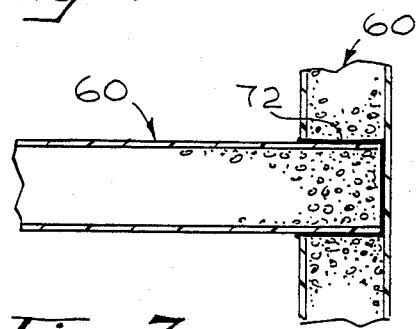
FIG. 7 is a schematic fragmentary cross section of interconnected horizontal and vertical shelving panels of the construction of FIG. 1.
Figure 8:
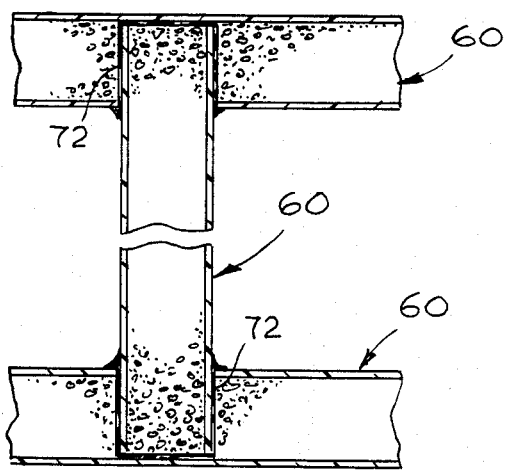
FIG. 8 is a schematic fragmentary cross section of interconnected horizontal and vertical partition panels of the construction of FIG. 1.
Figure 9:
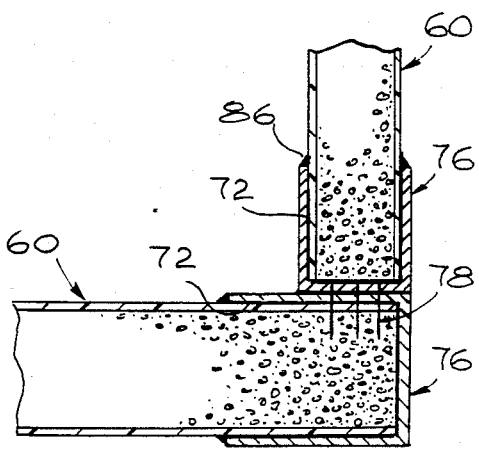
FIG. 9 is a schematic fragmentary cross section of interconnected base and sidewall panels employing end caps and pins in the construction of FIG. 1.

In accordance with the present method, mating components are formed (cut into) and sized in panels 60; in order to interconnect panels 60 together to form the desired construction. FIGS. 2-10(a) and FIGS. 11 and 12 demonstrate various interconnected panels 60 used in unit 20. Thus, FIGS. 2 and 3 show horizontal and vertical interconnected outside corner panels. FIG. 4 illustrates interconnected horizontal and diagonal panels 60. FIG. 5 illustrates interconnected outside corner horizontal, vertical and diagonal panels 60, and FIG. 6 illustrates interconnected horizontal and diagonal shelving panels 60. FIG. 7 illustrates interconnected horizontal and vertical shelving panels 60. FIG. 8 illustrates interconnected horizontal and vertical panels 60 and FIG. 9 illustrates interconnected base 22 panels 60 and sidewall 24 or 24 panels 60.

Figure 10:
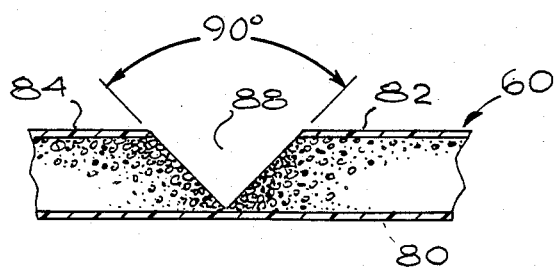
FIG. 10 is a schematic fragmentary cross section of a panel with a portion notched in accordance with the present method.
Figure 10A:
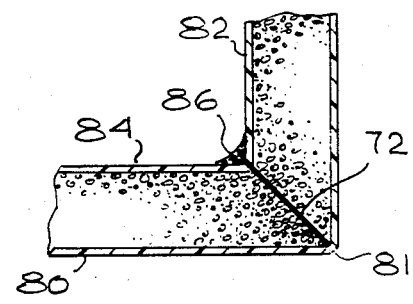

FIGS. 10 and 10(a) disclose a technique in accordance with the present method, which technique comprises fabricating outside corner joints wherein the outside sheet 80 is left intact and continuous after a 90 degree wedge at 88 is formed in panel 60, with the panel then being bent or folded over 90 degrees to form an outside corner 81. Adhesive layer 72 secures the respective portions of panel 60 together. FIGS. 11 and 12 show the use of a pair of spaced V-shaped notches 90 to permit panel 92 to be bent to a V-shaped configuration with a continuous outside sheet 94. Core 96 and sheet 98 are notched. Adhesive 100 secures notches 90 together.

Further, in accordance with the present method, after forming and sizing operations, the panels are cleaned and then they are interconnected with adhesive at their mating components while in a clean, dust-free environment, such as a "clean room". This environment is necessary to assure that the adhesive will thoroughly and permanently set and bond the panels together. If dust and/or other contaminates are present during the adhesive bonding step, the resulting bond will be weak and compromise the integrity of the construction. Moreover, dirt may be introduced into the construction and cause contamination of foods, etc., subsequently placed in the construction, as when it is to be used as a galley.

It should be noted that if excess adhesive 72 is used in the joints, the excess adhesive forms a fillet as shown at 86 to provide additional structural integrity. This is a desired step in the present method.

As shown in FIGS. 2, 4, 6, 7 and 8, inclusive, the joined portions of interconnected panels 60 of unit 20 can be notched out in a manner so as to fit flush together. The areas of contact between such panels 60 are sealed together by layers 72 of adhesive, preferably of quick setting plastic bonding material compatible with core 62 and sheets 68 and 70; applied in the clean environment. If desired, core 62 can be directly bonded to sheets 68 and 70, as by adhesive or thermal bonding, for example, at about 250 degrees for 30 minutes or can be air dryed for 24 yours or left unbonded all together, except at layers 72, all in the clean environment.

Supplemental joining means can also be used to interconnect panels 60 in forming unit 20. Thus, FIGS. 3 and 4 show the use of flexible flame retardant plastic cloth strips 74 over the joints of adjoining panels 60. Preferably, strips 74 are also of Kevlar plastic or their equivalent and are thermally or adhesively bonded to panels 60, specifically to adjoining sheets 68 and/or 70. Strips 74 may be, for example, about 0.032 to 0.063 inches thick. The thermal bonding is affected in the clean environment.

FIGS. 3 and 5 illustrate panels 60 joined together by adhesive layers 72 without notching out of portions of panels 60. However, in these instances the forming and sizing steps comprise cutting the adjoining end portions for a perfect fit. FIG. 9 shows the use of metal or plastic end caps 76, preferably of 6061T3 aluminum, on ad panels 60. Caps 76 preferably are about 0.063 to 0.090 inches thick and are secured to panels 60 with adhesive layers 72, as shown in FIG. 9, or can be thermally bonded thereto in the same manner as strips 74 or can otherwise be joined thereto. End caps 76 are also preferably connected together by one or more internal positioning blind fasteners, 78 of aluminum or the like and/or can be externally adhesively or otherwise bonded together, for example, with adhesive layer 72.

As a specific example of the present method, referring more particularly again to FIGS. 11 and 12, panel 92 comprises a rigid high temperature foamed plastic core 96 of phenolic resin having carbon-fiber reinforced polyimide resin sheets 94 and 98 attached to opposite sides thereof. Panel 92 is cut with a suitable sharp edged cutting tool to provide V-shaped 90° notches 90 therein, spaced about 8 inches from each other. Notches 90 extend through sheet 98 and core 96, as shown in FIG. 11, but not into sheet 94.

After cleaning panel 92, and deburring notches 90, panel 92 is placed in a clean dust-free room and handled in a clean sterile manner. Notches 90 are coated with an excess of a high temperature plastic adhesive which is a liquid phenolic resin then closed by bending sheet 94 to the configuration of FIG. 12 whereupon panel 92 is held closed in a jig assembly and heated in the clean room to above 100° C. i.e., to above the setting and curing temperature of the resin and held in excess of 30 minutes at that temperature to permanently bond panel 92 into the configuration of FIG. 12. Panel 92 is then removed from the jig assembled, recleaned and then painted in the clean room.

After the paint has set, panel 92 is removed and used successfully in unit 20. Unit 20 is also assembled in the clean room and is thoroughly tested in the manufacturing plant before shipping it to the customer. Unit 20 is devoid of external mechanical fasteners and reinforcements and it features smooth easily cleaned exposed surfaces without joint lines. All galley surfaces are streamlined as to present easily sterilized food-receiving surfaces. Corrosion and contamination are readily avoided.

FIGS. 2–9, inclusive, illustrate the fact that unit 20 which may, for example, be one of two complementary (mirror image) units 20 formed an airliner galley or the like, can be easily, securely and conveniently fabricated of panels 60 interconnected as shown in FIGS. 2–9 to form a strong, light weight unitary construction. This construction represents substantial savings in fabrication and maintenance costs. Weight reductions of 25–40% from conventional constructions are obtained. Other advantages are as set forth in the foregoing.

Various changes, modifications, alterations and additions can be made in the improved method of the present invention and in the steps, components and parameters thereof. All such changes, modifications, alternations and additions as are within the scope of the appended claims form part of the present invention.

What is claimed is:

1. An improved method of fabricating a unitary, lightweight, high strength, flame retardant, thermally and acoustically insulative plastic airline galley, said method comprising:
   (a) forming and sizing mating components in a plurality of building panels, each of said panels comprising,
      i. a core comprising a sheet of rigid, expanded lightweight plastic, said plastic having a closed cellular structure, high flame resistance and low thermal conductivity, a density of less than 5.0 lbs. per cubic foot, which exhibits good chemical resistance, and is gas-tight, vermin-proof and waterproof, and,
      ii. self-supporting sheets of high tensile strength, lightweight fibrous plastic abutting opposite sides of said core sheet to form a unitary laminate composite, said high strength fibrous sheets being heat resistant, flame retardant and flexible and having a tensile strength which is in excess of four times that of a comparable weight of stainless steel;
   (b) deburring and smoothing said panels to present clean and substantially continuous mating surfaces;
   (c) cleaning said panels including said sized mating components; and
   (d) interconnecting certain of said panels to one another in a totally clean, dust free environment by,
      (1) forming a recess in the core and core sheet on one side of a panel which does not extend through the core sheet on the opposite side of said panel,
      (2) applying an excess of adhesive to the sides of the recess and mating surface of the panels,
      (3) inserting the panel into the recess while allowing some adhesive to be squeezed out from the recess, and
      (4) removing excess adhesive from the jointure between mating panels in a manner so as to provide a rounded fillet of adhesive at said jointure, thereby presenting a smooth continuous inner surface;
   (e) providing rounded outside corners on said galley by,
      (1) removing a wedge of core material from one side of a panel by piercing through one core sheet but not the opposed core sheet,
      (2) applying adhesive to the surface of the wedge,
      (3) bending the panel until the opposed surfaces of the wedge meet,
      (4) removing excess adhesive from the jointure of the pierced core sheet so as to provide a rounded fillet of adhesive at said jointure, thereby presenting a smooth, continuous surface;

(f) wherein said galley comprises a unit with continuous outside and inside surfaces which are relatively easy to clean and which prevent the accumulation of vermin and dirt in inter-connecting points of said unit.

2. The improved method of claim 1 wherein the exposed surfaces of said construction are cleaned with organic solvent while in said clean environment, then wiped dry and painted.

3. The improved method of claim 1 wherein said core comprises a solidified mixture having a closed gas tight cell structure which is chemically resistant, water-proof and vermin proof, acoustically insulative and of controlled density.

4. The improved method of claim 1 wherein said interconnecting is also effected by the application in said clean environment of heat resistant, flame retardant flexible plastic cloth to bridge and locking adjoining ones of said panels together in said construction while providing a continuous outer surface.

5. The improved method of claim 4 wherein said cloth comprises plastic cloth and wherein said cloth is adhesively bonded to the exterior of said adjoining panels.

* * * * *